United States Patent
Tuckey et al.

[11] Patent Number: 6,145,532
[45] Date of Patent: Nov. 14, 2000

[54] FUEL TANK FILL LEVEL CONTROL AND VAPOR VENTING VALVE

[75] Inventors: Charles H. Tuckey, Cass City; G. Clarke Oberheide, Troy, both of Mich.

[73] Assignee: Walbro Corporation, Cass City, Mich.

[21] Appl. No.: 08/980,901

[22] Filed: Dec. 1, 1997

[51] Int. Cl.[7] .................................................. F16K 24/04
[52] U.S. Cl. ............................................. 137/202; 137/43
[58] Field of Search ...................................... 137/43, 202

[56] References Cited

U.S. PATENT DOCUMENTS

| | | | |
|---|---|---|---|
| 3,428,078 | 2/1969 | Christopher | 137/202 X |
| 4,991,615 | 2/1991 | Szlaga et al. | 137/202 X |
| 5,535,772 | 7/1996 | Roetker et al. | 137/202 X |
| 5,579,802 | 12/1996 | Tuckey | 137/202 |
| 5,590,697 | 1/1997 | Benjey et al. | 137/43 X |
| 5,666,989 | 9/1997 | Roetker | 137/202 X |
| 5,687,753 | 11/1997 | Doll | 137/43 |
| 5,755,252 | 5/1998 | Bergsma et al. | 137/43 X |
| 5,762,090 | 6/1998 | Halamish et al. | 137/202 X |
| 5,782,258 | 7/1998 | Herbon et al. | 137/202 X |

FOREIGN PATENT DOCUMENTS

| | | | |
|---|---|---|---|
| 4-201720 | 7/1992 | Japan | 137/202 |

*Primary Examiner*—Gerald A. Michalsky
*Attorney, Agent, or Firm*—Reising, Ethington, Barnes, Kisselle, Learman & McCulloch, P.C.

[57] ABSTRACT

A high flow rate fuel vapor vent valve assembly has a delayed fall away fill level control float responsive to the level of fuel in the fuel tank and constructed to control the closing of an outlet passage through which fuel vapors are vented from the fuel tank when a desired maximum fuel level is reached within the fuel tank during refueling of the tank. The fill level float is constructed to sink after refueling of the fuel tank is completed, and preferably several minutes thereafter, to control the opening of the outlet passage and permit fuel vapors to once again vent from the fuel tank. Staggered openings in the housing of the valve assembly permit the fuel vapor to vent from the fuel tank through the outlet passage when it is open but prevent splashing or sloshing fuel within the fuel tank from flowing through the outlet passage and to a vapor canister downstream of the outlet passage. During filling of the fuel tank when the outlet passage is severely restricted or closed, the pressure within the fuel tank increases to cause fuel to rise in the fill pipe and actuate the automatic shut-off of a refueling nozzle of a fuel station fuel pump and prevent substantial additional fuel from being added to the fuel tank.

37 Claims, 3 Drawing Sheets

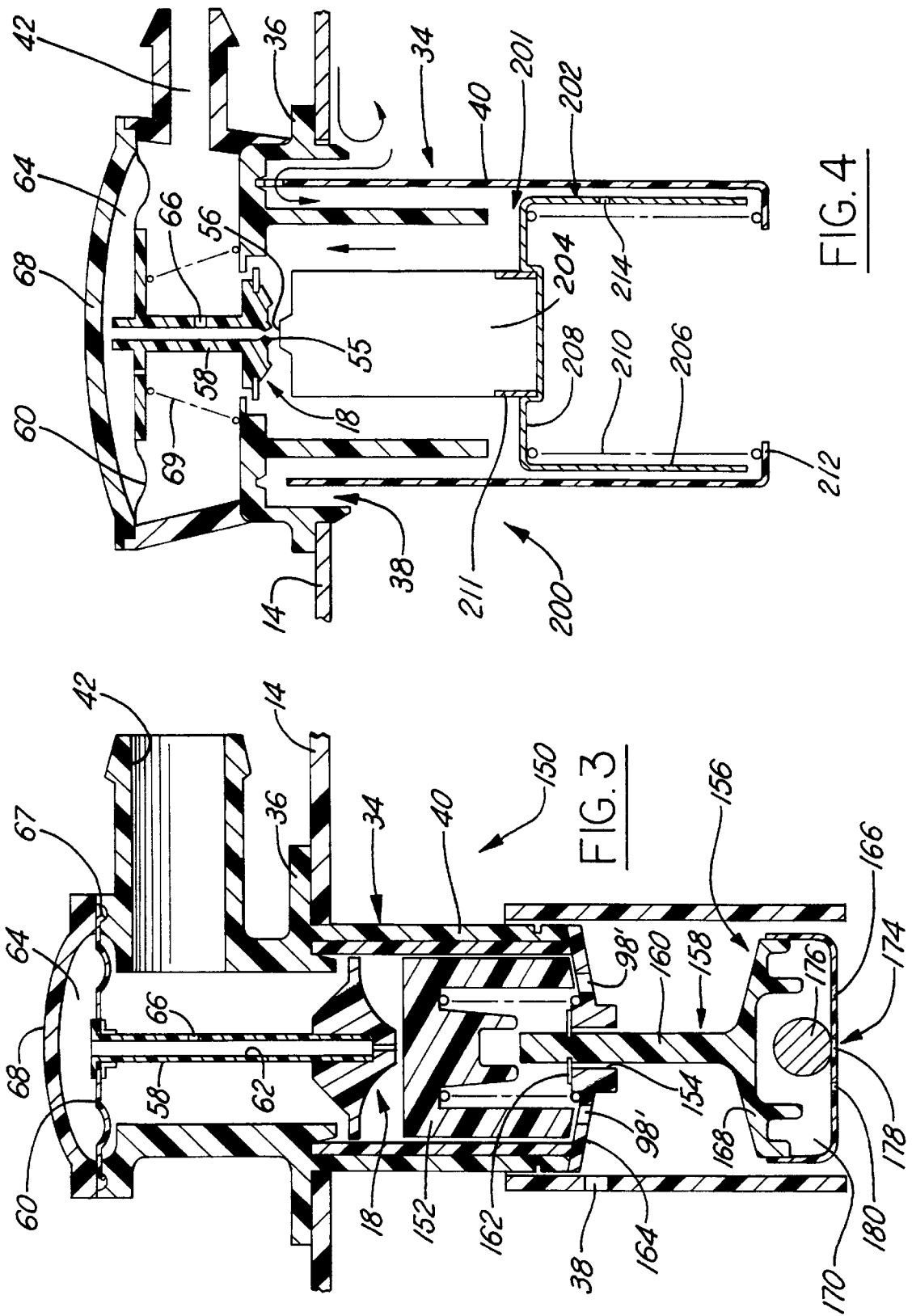

FUEL TANK FILL LEVEL CONTROL AND VAPOR VENTING VALVE

FIELD OF THE INVENTION

This invention relates to vehicle fuel tanks and more particularly to a valve assembly for controlling the flow of fuel vapor from a vehicle fuel tank and for controlling the maximum fuel level of the fuel tank.

BACKGROUND OF THE INVENTION

Environmental concerns and governmental regulations require reduced emissions of volatile hydrocarbon fuel vapors into the atmosphere. One source of hydrocarbon fuel vapors is the fuel tanks of vehicles using gasoline or other hydrocarbon fuels with high volatility. Fuel vapor can escape to the atmosphere during the filling of the tanks and usually even after the tanks are filled.

The use of an onboard vapor recovery system to remove excess fuel vapor from the fuel tank is one solution to the problem. Typically, a canister with activated charcoal therein receives fuel vapors through a valve assembly mounted in the top of the fuel tank and communicates with the intake manifold of the vehicle engine for exhausting fuel vapor from the canister during operation of the engine. The valve assembly usually has a valve responsive to the level of fuel in the tank that enables the valve to stay open at a sufficiently low fuel level to permit fuel vapors to flow freely from the fuel tank into the canister. As the fuel level rises during filling to approach a desired maximum level of fuel in the tank, a float is raised to close the valve to prevent liquid fuel from flowing through the valve and into the vapor receiving canister. The closed valve also prevents fuel vapor from flowing into the vapor receiving canister. One such system is disclosed in U.S. Pat. No. 5,579,802.

Some of these systems use a high capacity or high flow rate valve to control the flow of vapor from the fuel tank to the vapor storage canister. Current high capacity or high flow rate valve designs tend to be forced into and held in a closed position, when they should be open, by the vapor pressure in the fuel tank. This prevents the vapor from flowing through the valve and into the vapor storage canister. Thus the purpose of the system is defeated because the vapor is not allowed to pass through the valve and into the storage canister and then may be even discharged to the atmosphere. Further, using a single float responsive to the fuel level in the fuel tank to close the valve maintains the valve closed while the fuel level remains at or near the desired maximum level of fuel in the tank. This is undesirable because the addition of fuel to the tank when the valve is closed will increase the pressure within the tank and can increase the discharge of the hydrocarbon fuel vapors into the atmosphere.

SUMMARY OF THE INVENTION

A high flow rate fuel vapor vent valve assembly has a delayed fall away fill level float responsive to the level of fuel in the fuel tank and constructed to control the closing of an outlet passage through which fuel vapors are vented from the fuel tank when a desired maximum fuel level is reached within the fuel tank during refueling of the tank. The fill level float is constructed to sink after refueling of the fuel tank is complete, and preferably several minutes thereafter, to control the opening of the outlet passage and permit fuel vapors to once again vent from the fuel tank. Staggered openings in the housing of the valve assembly permit the fuel vapor to vent from the fuel tank through the outlet passage when it is open but prevent splashing or sloshing fuel within the fuel tank from flowing through the outlet passage and to a vapor canister downstream of the outlet passage. During filling of the fuel tank when the outlet passage is severely restricted or even closed, the pressure within the fuel tank increases to actuate the automatic shut-off of a refueling nozzle of a fuel station fuel pump and prevent additional fuel from being added to the fuel tank.

In one form, the fill level float is cup-shaped and has a calibrated orifice in its lower wall through which fuel slowly enters the float until sufficient fuel is within the float that it sinks to the bottom of the valve assembly housing. In another form, the fill level float has an inverted cup-shape and air or fuel vapors become trapped therein when liquid fuel encloses the bottom of the float to make the float buoyant. A control port in this fill level float permits the trapped gases to slowly escape to reduce the buoyancy of this float until it sinks. Preferably, the float is spring biased to insure that in any vehicle roll-over condition the float rapidly closes the outlet passage and that it continues to close the outlet passage even if completely submerged in liquid fuel.

Objects, features and advantages of this invention include providing a vapor vent valve assembly which has a high flow rate or capacity, opens and closes in response to the level of fuel in the tank without being adversely affected by the pressure of fuel vapor in the tank, prevents a vapor receiving canister from receiving liquid fuel, closes in a vehicle roll-over condition, limits the maximum level of fuel within the fuel tank during filling, enables fuel vapor to vent from the fuel tank even when the fuel tank is completely filled with fuel, provides a more gentle shut-off of a refueling nozzle, avoids spit back of fuel from the tank fill pipe during shut-off of a refueling nozzle, provides fuel tank over pressure relief, and is rugged, durable, reliable, and of relatively simple design and economical manufacture and assembly, and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

FIG. 3 is a sectional view of an alternate embodiment of the vapor vent valve assembly embodying this invention;

FIG. 4 is sectional view of a third embodiment of the vapor vent valve assembly embodying this invention.

DETAILED DESCRIPTION OF THE PREFERRED EMBODIMENTS

Figure 1:
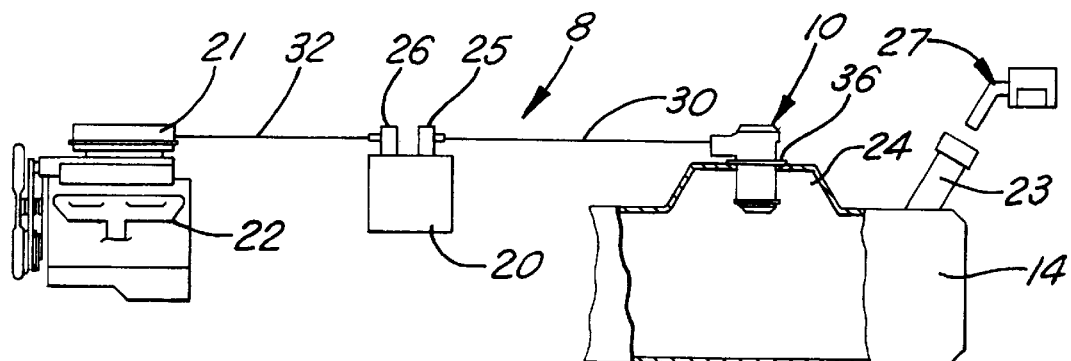
FIG. 1 is a semi-diagrammatic view of a vehicle fuel system illustrating the vehicle engine, vapor recovery canister, fuel tank and a vapor vent valve assembly embodying this invention.
Figure 2:
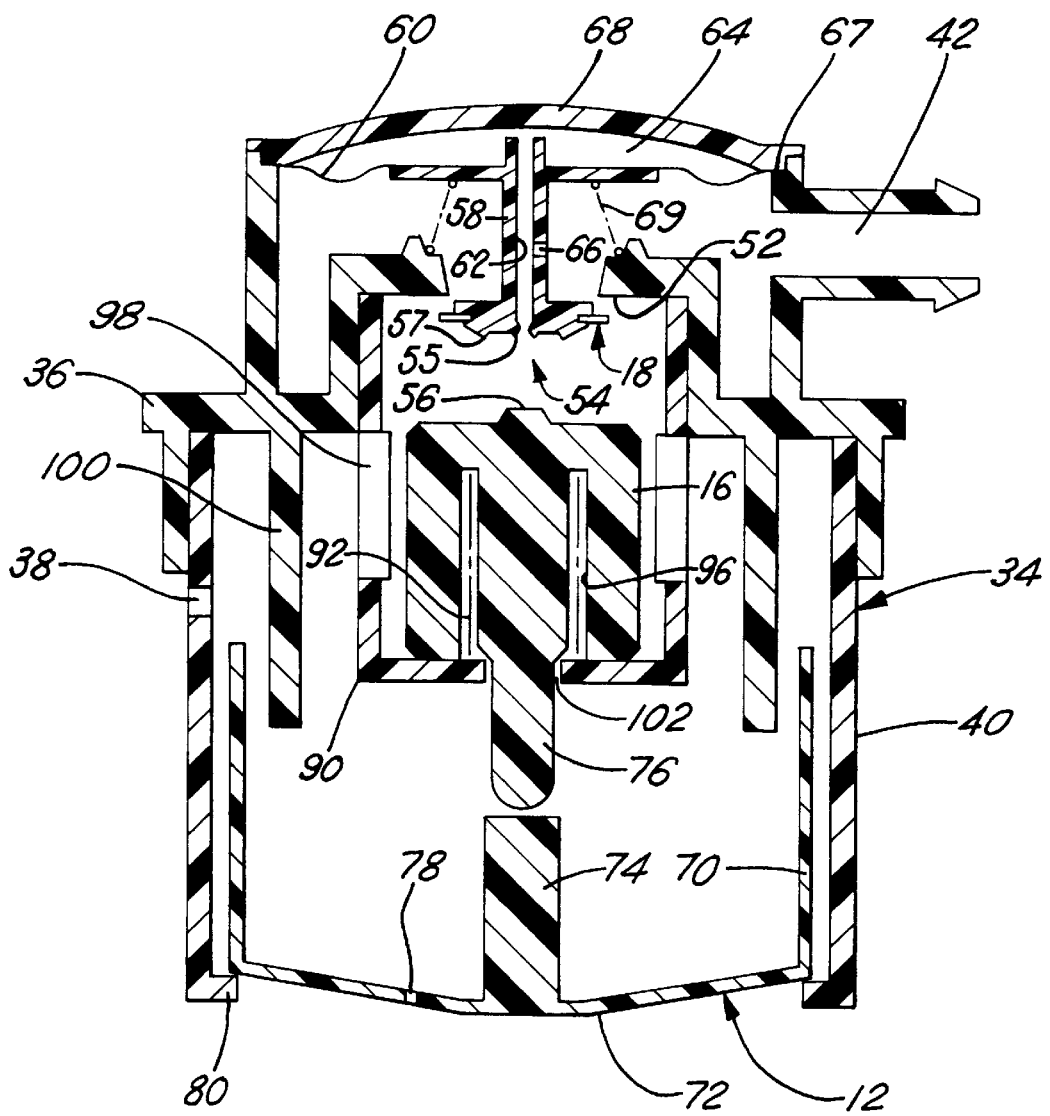
FIG. 2 is a sectional view of the vapor vent valve assembly of FIG. 1.

FIGS. 1 and 2 illustrate a vehicle fuel system 8 with a high flow rate fuel vapor vent valve assembly 10 embodying this invention and having a delayed fall away fill level float 12 responsive to the level of fuel in the fuel tank 14 and constructed to displace a second float 16 to close a main valve 18 to both limit the maximum fuel level within the tank 14 and to prevent liquid fuel from flowing through the main valve 18. The valve assembly 10 is mounted in the top of the fuel tank 14 and preferably within a raised area in the top wall of the tank 14 which provides a well defined vapor dome 24. The valve assembly 10 is connected to a fuel vapor storage canister 20 which in turn is connected to the intake manifold 21 of an internal combustion engine 22. The tank 14 is filled with a volatile liquid hydrocarbon fuel such as gasoline through a fill pipe 23 or tube with an inlet disposed vertically above the top of the tank 14 and typically received in an access pocket of the vehicle. During refueling, when the fuel tank 14 becomes full, liquid fuel will rise in the fill pipe 23 and close-off a control port adjacent the outlet of a refueling nozzle 27 of a fuel station fuel pump to actuate an automatic shut-off device in the nozzle 27 and prevent additional fuel from being added to the tank 14. Thereafter, each attempt to overfill the tank will result in liquid fuel again rising in the fill pipe 23 and actuating the automatic shut-off device of the refueling nozzle.

Typically, the canister 20 is filled with activated charcoal (preferably grade 15) to absorb the hydrocarbon vapors received from the valve assembly 10 through an inlet port 25 and to discharge the vapor through an outlet or purge port 26 into the intake manifold 21 of the engine 22. The interior of the canister 20 is vented to the atmosphere through a port in the top of the canister (not shown). The canister 20 may be mounted in the vehicle a few feet from the gas tank 14 and is connected to the valve assembly 10 and the intake manifold 21 by suitable flexible hoses 30, 32.

As shown in FIG. 2, the valve assembly 10 has a generally cylindrical housing 34 with a peripheral flange 36 which, in assembly, overlies and is sealed to the top of the fuel tank 14. To allow fuel vapor to flow into the housing 34 from the fuel tank vapor dome 24, the housing 34 has one or more openings or vapor passages 38 in its side wall 40 located adjacent and below the top of the fuel tank 14. To allow the fuel vapor to flow from the valve assembly 10 to the vapor receiving canister 20, preferably the valve assembly 10 has an outlet passage 42 constructed to be in communication with the vapor receiving canister 20.

The valve assembly 10 controls the flow of fuel vapor from the fuel tank 14 to the vapor canister 20 and has a main valve 18 that closes on a seat 52 in the housing 34. Preferably, to prevent liquid fuel from entering the valve assembly 10 above the main valve 18 and flowing into the vapor canister 20, the seat 52 and main valve 18 are located above the vapor passages 38 in the side wall of the housing 40. The main valve 18 has a pilot valve 54 with a seat 55 which is sealingly engagable with a closure 56 on the second float 16 located beneath the main valve 18. To prevent any liquid fuel which contacts the main valve 18 from flowing through the pilot valve 54, the main valve 18 has a circular depending rim 57 spaced from the pilot valve 54. Any liquid fuel collects on and drips from the rim 57 away from the pilot valve 54.

A hollow rigid stem 58 is connected to the main valve 18 and to a diaphragm 60 located near the top of the valve assembly 10. The stem 58 has a passage 62 therethrough which communicates with a chamber 64 defined above the diaphragm 60 and the pilot valve 54 carried by the main valve 18. The stem 58 also has a small opening 66 in its sidewall that acts as a pressure "bleed-off" to allow pressure in the chamber 64 to be slowly reduced when the pilot valve 54 is essentially closed. The port 66 is substantially smaller than the opening of the unrestricted valve seat 55.

The diaphragm 60 has a peripheral rib 67 which is received between and sealed to a top plate 68 or cap and the housing 34 of the valve assembly. The center of the diaphragm 60 is axially displaceable in response to the vapor pressure acting on the diaphragm 60. The stem 58 rigidly connects the center of the diaphragm 60 to the main valve 18 so that movement of the diaphragm causes a corresponding movement of the main valve 18, and vice versa.

When the pilot valve 54 is open the diaphragm chamber 64 is in communication with the vapor dome 24 in the interior of the fuel tank 14. To balance or oppose the force of the vapor pressure in the tank 14 that tends to move the main valve 18 upward toward a closed position, the vapor pressure in the diaphragm chamber 64 creates an opposing downward force on the diaphragm 60. This downward force may be equal to or greater than the upward force of the vapor pressure on the main valve 18 and tends to prevent upward displacement of the diaphragm 60, holding the main valve 18 in an open position. Thus, while the pilot valve assembly 54 is open these opposing forces counteract, and may balance or cancel each other. The magnitude of each force will be a function of the effective surface areas of the diaphragm 60 and the main valve 18 and if these areas are equal the opposing forces will cancel out or be balanced. Preferably the effective area of the diaphragm 60 is greater than that of the main valve 18 and hence a net force tending to open the main valve 18 is produced. Preferably the weight or force of gravity acting on the pilot valve 54, stem 58 and diaphragm 60 are partially counterbalanced or opposed by the force produced by a light spring 69 received between the diaphragm 60 and the housing 34. In some applications utilizing various sensors and control systems, it is desirable to have a closed fuel tank under essentially atmospheric pressure conditions. For such applications it is preferable that the spring 69 biases the main valve 18 closed until a pressure of about 10 in. $H_2O$ exists in the fuel tank whereupon the valve 18 opens.

The fill level float 12 is preferably made of a plastic resistant to degradation when exposed in hydrocarbon fuels and is cup-shaped with a cylindrical sidewall 70 and integral base 72. A pin 74 extends upwardly from the base 72 and is constructed to engage a depending pin 76 of the second float 16 to move the second float 16 towards the main valve 18. A calibrated fill orifice 78 permits fuel to slowly enter the fill level float 12 whereby, when sufficiently filled with fuel, the fill level float 12 will sink away from the second float 16 until it engages a lower flange 80 of the housing 34 which retains the fill level float 12 therein. Preferably, it takes a sufficient length of time, usually a minute or more and preferably several minutes, before the fill level float 12 sinks so that it remains buoyant during filling of the fuel tank 14 and for a short time thereafter to temporarily maintain the valve 18 essentially closed to actuate the automatic shut-off of the refilling nozzle of a fuel dispensing pump so that additional fuel is not added to the tank 14.

The second float 16 has a generally cylindrical outside diameter and is slidably received for reciprocation in a depending annular cup 90 of the housing 34 and yieldably biased upwardly by a coil spring 92 received between them. As shown in FIG. 2, for receiving the coil spring 92 the bottom of the float 16 has a blind annular recess 96 therein.

To retard liquid fuel, particularly when sloshing in the tank, from being forced past the float 16 and through the open valve 18 into the canister, the vapor passages 38 are offset, preferably both vertically and circumferentially, from openings 98 through the cup 90 and the bottom of a depending annular wall 100 between the cup 90 and sidewall 40. The cup 90 retains the lower end of the spring 92 and has a central opening 102 through which the second float pin 76 projects for engagement by the fill level float pin 74.

To insure that in any vehicle roll-over condition the float 16 rapidly completely closes the main valve 18 and that it remains completely closed even if the float 16 is completely submerged in liquid fuel, preferably the float 16 has a specific gravity greater than that of the liquid fuel with which it is utilized. Typically, the liquid fuel has a specific gravity of about 0.6 to 0.8 and the float has a specific gravity in the range of about 0.9 to 1.4 and preferably about 1.0 to 1.1. Preferably the float 16 is made of a nonporous dense plastic material that is highly resistant to degradation by contact with hydrocarbon fuels such as gasoline, gasohol and diesel fuel, such as an acetal copolymer having a density of about 1 gram per cubic centimeter. When the vehicle is in its normal upright position, the force produced by the spring 92 must be small enough so that the main valve 18 will remain open when the float 16 is not disposed in any liquid fuel and yet large enough so that the force produced by the spring plus the buoyancy force of the float 16, even when it is fully immersed in liquid fuel, will be sufficient to completely close both the pilot valve 54 and the main valve 18.

When the unit is in its normal upright position, the force produced by the spring 92 must be less than the force of gravity acting on the float 16 when it is not disposed in any liquid fuel, so that the main valve assembly 18 will be in its open position. Preferably, the force produced by the spring 92 is less than the force of gravity acting on the float 16 alone so that both the main valve 18 and pilot valve 54 will be fully open in the normal upright position when the floats are not in any liquid fuel.

If the feature of the main valve 18 closing and remaining closed upon roll-over of the vehicle is not required, then if desired the spring 92 can be eliminated and a float 16 utilized having a specific gravity less than that of the liquid fuel with which it is used to provide a sufficient buoyancy force to directly close the main and pilot valves 18 & 54 when the float is partially immersed in the liquid fuel.

Operation

In an at least partially empty vehicle fuel tank 14, when the fuel level is not high enough to contact the fill level float 12 of the valve assembly 10, as shown in FIG. 2, the main valve 18 is fully open and preferably the pilot valve 54 is also fully open and the float 16 is spaced downwardly from it. Fuel vapor from the tank 14 flows through the vapor passages 38 in the side of the valve assembly 10 and through the main valve 18 and into the canister 20. To prevent the vapor pressure acting on the bottom of the main valve 18 from closing it, the fuel vapor pressure is transmitted through the pilot valve 54 into the diaphragm chamber 64 and acts on the diaphragm 60 to prevent upward displacement of the diaphragm 60 and thus, of the main valve 18 to which it is rigidly connected. This holds the main valve 18 in an open position and allows a generally free flow of vapor from the tank 12 through the outlet 42 of the valve assembly 10 and into the vapor canister 20.

Typically, to fill an at least partially empty vehicle tank 14 with a liquid volatile fuel such as gasoline, gasohol or diesel fuel oil, a refueling nozzle 27 with an automatic shut-off of a station fuel pump is inserted into the inlet of the fill pipe 23 and the nozzle valve is manually opened to discharge liquid fuel through the fill pipe 23 and into the tank 14, usually at a pressure of about 25 to 30 psi and a flow rate of 10 to 12 gallons per minute. The fuel flowing into the tank 14 produces a superatmospheric pressure in the tank 14 which forces fuel vapor through the valve assembly 10 and into the canister 20. The charcoal in the canister 20 absorbs the fuel vapor and discharges "cleaned" air and other gases to intake manifold 21 of the engine 22 and/or to the atmosphere through the canister vent valve.

During filling, as the level of liquid fuel in the tank 14 rises above the bottom of the valve assembly 10, the fill level float 12 becomes partially submerged in fuel and moves generally vertically upward, with the rising fuel level whereupon the fill level float pin 74 bears on the pin 76 of the second float 16 to displace the second float 16 towards the main valve 18. When the closure 56 on the second float 16 comes into close proximity of the seat 55 of the pilot valve 54 it severely restricts the opening to the passage 62 and due to the bleed port 66 causes the pressure in the chamber 64 to be decreased and the diaphragm 60 to move the main valve 18 toward its closed position to retard the flow of fuel vapor from the fuel tank. When the main valve 18 sufficiently retards the flow of fuel vapor from the main tank, the pressure in the main tank increases, and fuel rises in the fill pipe to contact the outlet of the refueling nozzle 27 and actuate its automatic shut-off mechanism and stop the dispensing of fuel.

If an attempt is made to further fill the tank, a small quantity of additional fuel will be dispensed and the refueling nozzle 27 will again automatically shut-off. If a sufficient number of attempts are made to further fill the tank its fuel level will rise enough for the float 12 and tank pressure acting on the main valve 18 to fully close it.

It is theorized that the second float 16 does not have to fully close or physically seal the pilot valve 54 to actuate the main valve 18. Rather, when the second float 16 sufficiently restricts the flow through the pilot valve 54 it is believed that a pressure differential is generated across the main valve 18 which moves the main valve 18 towards its closed position. Similarly, it is also believed that the main valve 18 does not have to fully close to actuate the automatic shut-off of the refueling nozzle. Rather, it is currently believed that when the main valve 18 is moved sufficiently towards its closed position the flow therethrough becomes severely restricted and the pressure within the fuel tank 14 increases until liquid fuel rises in the fill pipe 23 to actuate the automatic shut-off of the refueling nozzle 27. Because the main valve 18 does not have to be rapidly forced fully closed, the pressure in the fuel tank 14 increases more gradually so that the fuel rise is slower in the fill pipe 23 to more gently actuate the automatic shut-off of the refueling nozzle 27 and prevent "spitback" or overflow of liquid fuel out of the fill pipe 23. Further, because the main valve 18 and pilot valve 54 do not have to fully close, they more readily and easily move towards their fully open positions to vent fuel vapor from the fuel tank. Regardless of this theoretical explanation, and whether or not these valves 54 and 18 fully close, it has been empirically determined that the valve assembly 10 performs well and achieves its intended results.

When liquid fuel is in contact with the fill level float 12 the fuel slowly enters the fill level float 12 through the orifice 78 to reduce the buoyancy of the float 12 until the float 12 sinks or falls away from the second float 16. When the fill level float 12 sinks, the force of gravity on the second float 16 moves the second float 16 away from the pilot valve 54 so that the main valve 18 will open and fuel vapor may be vented from the fuel tank 14 even when there is a maximum level of fuel in the tank 14. It preferably takes several minutes for the fill level float 12 to sink to ensure that the refueling of the fuel tank 14 is completed and the desired maximum fuel level is not exceeded.

The maximum desired fuel level can be changed by changing the axial length of the sidewall 40 of the housing or by changing the length of one or both of the float pins 74, 76 to change the level of fuel necessary to cause the fill level float 12 to move the float 16 to close the main valve 18.

These relatively simple changes permit use of the valve assembly 10 with fuel tanks of various construction and also permit easy calibration of the valve assembly to control the maximum fuel level in the tank for any given fuel tank construction.

When the main valve 18 and pilot valve 54 are open and the engine 22 is operating, vapor will be removed from the canister 20 and drawn into the intake manifold 21 of the engine 22 where the fuel vapor will be mixed with intake air and supplied to the cylinders of the operating engine 22. This may also produce a sufficient vacuum or a sufficiently subatmospheric pressure in the canister 20 that fuel vapor in the fuel tank 14 will flow through the valve assembly 10 and into the canister 20. This subatmospheric pressure on the vapor canister 20 would also tend to close the main valve 18, but it is counterbalanced by the vapor pressure in the chamber 64 that tends to move the diaphragm 60 downward, holding the main valve 18 open.

Typically, when the engine 22 is shut-off and the main valve 18 is completely open, fuel vapor will flow from the tank 14, through the valve assembly 10 and into the canister 20 when the pressure in the tank is greater than atmospheric pressure by as little as about one inch to three inches of water pressure or about 0.004 to 0.1 pounds per inch square. Thus, the canister 20 and the valve assembly 10 provide negligible resistance to the flow of fuel vapor from the tank 14 whenever the main valve 18 is open.

Second Embodiment

FIG. 3 illustrates a second embodiment of a valve system 150 with a second float 152 that does not have a depending pin extending through the cup opening 154. The fill level float 156 has a body 158 with a stem 160 extending through the cup opening 154 and constructed to engage the second float 152. A retainer clip 162 on the stem 160 engages the cup 164 to limit movement of the fill level float 156 away from the second float 152. A cap 166 fitted over the base 168 of the body 158 defines a fluid chamber 170 therebetween. A vehicle motion valve assembly 174 in the chamber 170 has a ball 176 which substantially seals a relatively large opening 178 in the cap 166. When the vehicle is not moving, such as during filling of the fuel tank 14, the ball 176 prevents liquid fuel from entering the chamber 170 and the fill level float 156 is responsive to the level of fuel in the tank 14. When the vehicle moves, the ball 176 rolls away from the opening 178 permitting fuel to rapidly flow through the opening 178 and fill the chamber 170 to thereby cause the fill level float 156 to sink. Optionally, the cap 166 also may have a calibrated fill orifice 180, as in the first embodiment. Valve assembly 150 functions in otherwise essentially the same manner as valve assembly 10 and hence, its operation will not be further described.

Third Embodiment

FIG. 4 illustrates a third embodiment of a valve assembly 200 with a float assembly 201 which provides both a fill level float 202 and actuates the pilot valve. A closure 56 for the pilot valve 54 is fixed on the open end of a stem 204 and disposed beneath the pilot valve seat 55. The lower portion or fill level float 202 has an inverted-cup shape with a cylindrical side wall 206 and an upper wall 208 and is biased by a spring 210 received between a retainer rim 212 of the housing sidewall 40 and the upper wall 208 of the lower float 202. The inverted cup shape shields the main valve 18 from splashing or sloshing fuel to help prevent liquid fuel from entering the main valve 18. The stem 204 is fixed to the float 202 such as by an interference press fit in a ring 211 fixed to the upper wall 208 of the float. When the level of fuel in the fuel tank 14 reaches the bottom of the float 202, air and/or fuel vapor becomes trapped within the float making the float assembly 201 buoyant. The float assembly 201 rises with the rising fuel level in the fuel tank until the closure 56 sufficiently restricts flow through the pilot valve 54 that the main valve 18 moves toward its closed position to sufficiently actuate the automatic shut-off of the refueling nozzle 27. A port 214 in the sidewall of the fill level float 202 permits the trapped air or vapor to slowly escape to reduce the buoyancy of the float 202 until the float assembly 201 sinks thereby displacing the closure 56 to cause the main valve 18 to open. Alternatively, the lower portion 202 may be constructed as in the first or second embodiment such that it can be filled with fuel to cause it to sink. The operation of the valve assembly 200 is substantially the same as the valve assembly 10 and hence, will not be further described.

Fourth Embodiment

Figure 5:
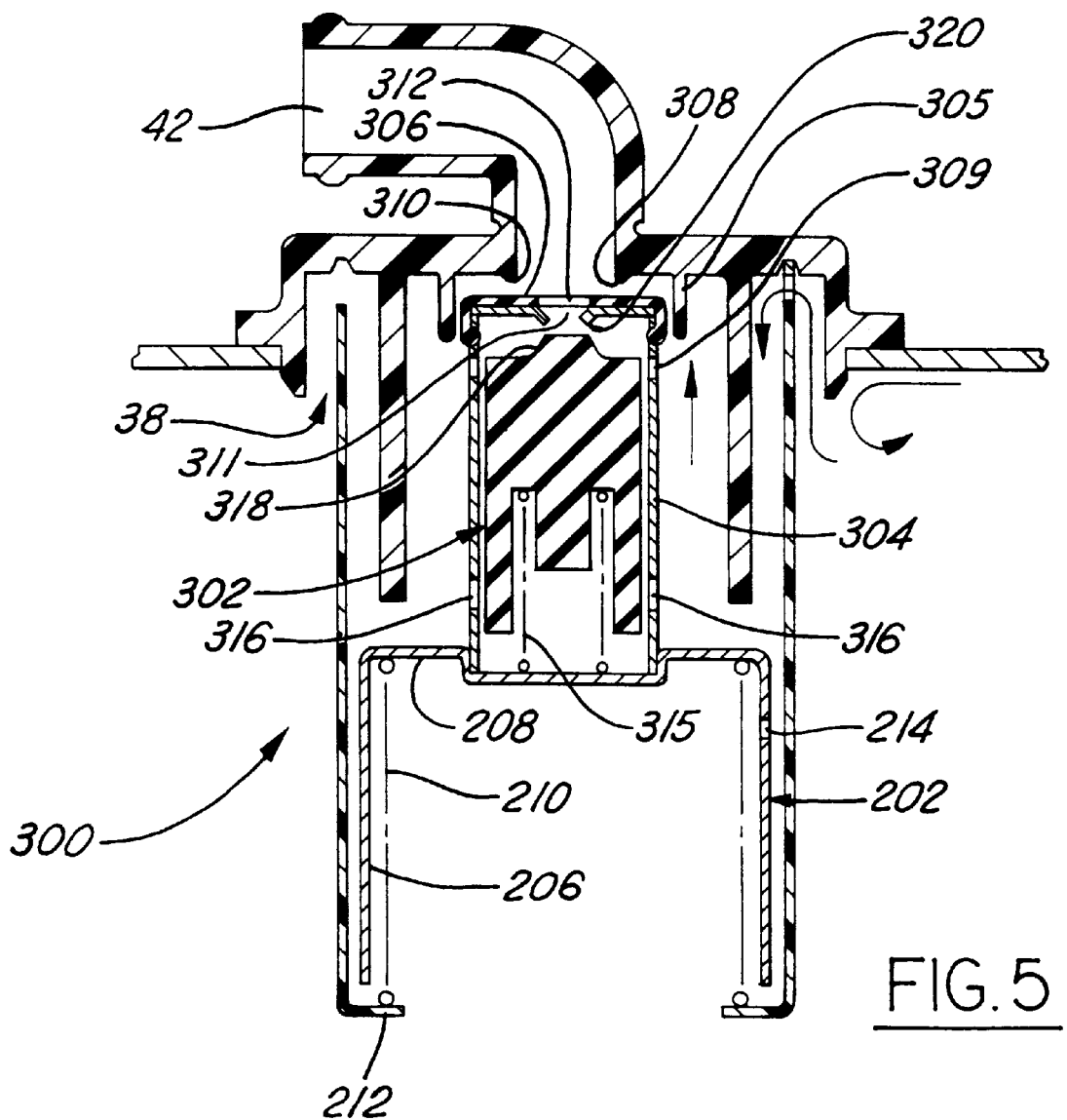
FIG. 5 is a sectional view of a fourth embodiment of the vapor vent valve assembly embodying this invention.

FIG. 5 illustrates a fourth embodiment of a valve assembly 300 with a fill level float 202 and a second float 302 slidably received in a cylindrical cage 304 press fit in a pocket in the upper wall 208 of the float 202.

The cage 304 is generally cylindrical and hollow and has a free end guided for reciprocation with the fill level float 202 by a depending skirt 305 of the housing. The free end of the cage 304 is covered by an end cap 306 preferably formed of a somewhat flexible and resilient material and constructed to engage a valve seat 308 surrounding a relatively large diameter inlet 310 to the passage 42 when the fill level float 202 becomes buoyant and sufficiently displaces the cage and end cap 306 onto the seat 308. Openings 309 through the sidewall of the cage 304 communicate with coaxial openings 311, 312 through the upper wall of the cage 304 and the end cap 306, respectively, to permit a reduced fuel vapor flow rate through them when the end cap 306 is on the seat 308. The openings 311, 312 are smaller than the valve seat 308 to inlet 310.

The second float 302 received in the cage 304 is buoyant in liquid fuel which enters the cage 304 through the openings 316. When the level of fuel in the cage is sufficiently high, the second float 302 moves a closure 318 onto a seat 320 to fully close the inlet 310 and prevent fluid flow into the passage 42.

This valve assembly 300 provides a two-stage closure of the inlet 310 wherein the effective flow area of the inlet 310 is reduced when the end cap 306 engages the seat 308 and is then fully closed when the second float 302 closes the opening 311. Preferably, the second float 302 has a specific gravity and is biased by a spring 315 so that it closes the opening 311 even when immersed in liquid fuel such as in a vehicle roll-over condition.

Operation of the Fourth Embodiment

During refilling of an at least partially empty fuel tank, when the level of fuel in the fuel tank reaches the bottom of the fill level float 202, the air and fuel vapor in the fill level float becomes trapped therein and the float 202 becomes buoyant and rises with the increasing fuel level until the end cap 306 engages and seals on the seat 308 whereupon fuel vapor is vented from the fuel tank through the openings 311, 312 and into the passage 42. During refueling, as the level of fuel in the fuel tank continues to rise, the fuel will pass around the outside of the fill level float 202 and enter the cage 304 through the openings 316. When the level of fuel is sufficient to cause the closure 318 to engage and seal on the seat 320 and thereby close the opening 311, fuel vapor is prevented from flowing through the inlet 310 and the pressure within the fuel tank increases until liquid fuel rises in the fill pipe 23 to actuate the automatic shut-off device of the refueling nozzle 27 to terminate refueling. The trapped air and fuel vapor in the fill level float 202 escapes slowly through the port 214 reducing the buoyancy of the fill level float 202 until it sinks causing the cage 304 and second float 302 to fall away from the inlet 310 to permit fuel vapors to once again be vented from the fuel tank.

In each embodiment, the fill level float 12, 156, 202 permits control of the maximum fuel level in the tank at a position remote from the outlet passage 42. This maintains a vapor dome 24 in the tank 14 and also prevents liquid fuel from flowing through the outlet passage 42 even when fuel in the tank is sloshing or splashing within the tank and adjacent the valve assembly 10, 150, 200, 300. Further, the offset vapor passages 38 and openings 98 through the cup 90 provide a convoluted flow path to also prevent liquid fuel from flowing through the outlet passage 42. The valve assembly sidewall 40 can be lengthened or shortened to vary the height at which the fill level float 12, 156, 202 is disposed and thus, vary the desired maximum fuel level in the tank 14. Alternatively, in the first and second embodiments, the fill level float pin 74 and/or the second float pin 76 can be modified to vary the length and relative position of each and thereby vary the desired maximum fuel level in the tank 14.

What is claimed is:

1. A vapor control apparatus for a vehicle fuel tank having a fill pipe with an inlet above the fuel tank comprising:
   a housing constructed to be received in the fuel tank adjacent the top of the fuel tank;
   an outlet passage in the housing and a main valve seat defined by the housing at an upstream end of the outlet passage, said outlet passage communicating the interior of the fuel tank with the exterior of the fuel tank and through which fuel vapor is vented from the fuel tank;
   a main valve carried by the housing, associated with the outlet passage and movable relative to the main valve seat from a normally open position permitting the free flow of fuel vapor from the interior of the tank through the outlet passage and toward a closed position at least severely retarding the flow of fuel vapor from the interior of the tank through the outlet passage in response to rising fuel level in the fuel tank;
   a bleed passage through the main valve communicating with the interior of the fuel tank and a pilot valve seat at the upstream end of the bleed passage;
   a fall away fill level control float received in the housing separate from the main valve, normally spaced from the pilot valve seat, and having a fluid container with a continuously open fluid bleed port;
   a pilot valve which is normally open and spaced from the pilot valve seat and movable toward the pilot valve seat in response to a rising fuel level in the fuel tank,
   a pilot float received in the housing and responsive to the level of fuel in the tank to move the pilot valve toward the pilot valve seat when a maximum fuel level is reached within the fuel tank when refueling the fuel tank, and
   the fall away fill level control float is initially responsive to the level of fuel in the fuel tank to control movement of the main valve sufficiently toward its closed position when a predetermined fuel level is reached within the fuel tank when refueling the fuel tank to cause fuel to rise in the fill pipe of the tank to a level adjacent the inlet of the fill pipe to actuate an automatic shut-off of a fuel refueling nozzle with its outlet received in the inlet of the fill pipe, and the continuously open fluid bleed port in the fluid container of the fill level control float is sized and constructed to bleed fluid at a rate delaying the reopening of the main valve for a period of time after refueling and to thereafter fully open the outlet passage to permit fuel vapor to flow through the outlet passage after refueling is completed.

2. The apparatus of claim 1 in which the pilot valve is carried by the main valve and has an open position spaced from the fill control float and a closed position engaged with the fill control float and when the pilot valve is open a net force acting on the main valve causes the main valve to be in its open position.

3. A vapor control apparatus for a vehicle fuel tank having a fill pipe with an inlet above the fuel tank comprising:
   a housing constructed to be received in the fuel tank adjacent the top of the fuel tank;
   an outlet passage in the housing and a main valve seat defined by the housing at an upstream end of the outlet passage, said outlet passage communicating the interior of the fuel tank with the exterior of the fuel tank and through which fuel vapor is vented from the fuel tank;
   a main valve carried by the housing, associated with the outlet passage and movable relative to the main valve seat from an open position permitting the free flow of fuel vapor from the interior of the tank through the outlet passage and toward a closed position at least severely retarding the flow of fuel vapor from the interior of the tank through the outlet passage;
   a fill control float received in the housing separate from the main valve and initially responsive to the level of fuel in the fuel tank to control movement of the main valve sufficiently toward its closed position when a predetermined maximum fuel level is reached within the fuel tank when refueling the fuel tank to cause fuel to rise in the fill pipe of the tank to a level adjacent the inlet of the fill pipe to actuate an automatic shut-off of a fuel refilling nozzle with its outlet received in the inlet of the fill pipe, and constructed to delay the reopening of the main valve for a period of time after refueling and to thereafter fully open the outlet passage to permit fuel vapor to flow through the outlet passage after refueling is completed;
   a pilot valve carried by the main valve, a diaphragm carried by the housing and defining a chamber, a stem operably connecting the diaphragm to the main valve, and a control passage through the stem which communicates the pilot valve with the chamber whereby the main valve, pilot valve, diaphragm and control float are constructed and arranged so that the main valve is open regardless of the pressure of gaseous fuel vapor in the fuel tank so long as the liquid fuel in the fuel tank does not cause the control float to close the main valve.

4. The apparatus of claim 3 which also comprises a vent passage formed in the stem and communicating the control passage with the outlet passage, the vent passage being substantially smaller in size than the pilot valve.

5. A vapor control apparatus for a vehicle fuel tank having a fill pipe with an inlet above the fuel tank comprising:
   a housing constructed to be received in a fuel tank adjacent the top of the tank;
   an outlet passage in the housing communicating the interior of the fuel tank with the exterior of the fuel tank;
   a main valve associated with the outlet passage and movable from an open position permitting the free flow of fuel vapor from the interior of the tank through the outlet passage and toward a closed position at least severely retarding the flow of fuel vapor from the interior of the tank through the outlet passage;

a fill control float received in the housing and initially responsive to the level of fuel in the fuel tank to control movement of the main valve sufficiently toward its closed position when a predetermined maximum fuel level is reached within the fuel tank when refueling the fuel tank to cause fuel to rise in the fill pipe of the tank to a level adjacent the inlet of the fuel pipe to actuate an automatic shut-off of a fuel refilling nozzle with its outlet received in the inlet of the fill pipe, and constructed to delay the reopening of the main valve for a period of time after refueling and to thereafter open the outlet passage to permit fuel vapor to flow through the outlet passage after refueling is completed;

a pilot valve carried by the main valve;

a diaphragm carried by the housing and defining a chamber;

a stem operably connecting the diaphragm to the main valve;

a control passage through the stem which communicates the pilot valve with the chamber whereby the main valve, pilot valve, diaphragm and the control float are constructed and arranged so that the main valve is open regardless of the pressure of gaseous fuel vapor in the fuel tank so long as the level of fuel in the fuel tank does not cause the control float to cause the main valve to close.

6. The apparatus of claim 5 which also comprises a second float, a closure for the pilot valve carried by the second float and a seat of the pilot valve carried by the main valve, and the control float actuates the second float to move the closure toward the seat of the pilot valve to move the main valve toward its closed position.

7. The apparatus of claim 5 wherein the fill control float is buoyant in liquid fuel and the apparatus also comprises a second float moveable from an open position toward a closed position by the fill control float when the fill control float is acted on by liquid fuel to move the main valve and pilot valve toward their closed positions.

8. The apparatus of claim 7 wherein the fill control float and second float are independently carried by the housing.

9. The apparatus of claim 7 wherein the fill control float and the second float are operably connected.

10. The apparatus of claim 7 which also comprises a calibrated orifice in the fill control float through which liquid fuel enters the float to cause it to sink when sufficiently full of fuel.

11. The apparatus of claim 7 wherein the second float has a specific gravity in the range of about 0.9 to 1.4.

12. The apparatus of claim 11 which also comprises a spring yieldably biasing the second float toward the closed positions of both the pilot valve and the main valve with a force produced by the spring which is small enough so that both the pilot and main valves remain open when the second float is not disposed in any liquid fuel and is large enough so that the force produced by the spring plus the buoyancy of the second float when it is immersed in liquid fuel and the apparatus is rolled-over will be sufficient to close both the pilot and main valves.

13. The apparatus of claim 7 which also comprises a valve assembly associated with the fill control float wherein the valve assembly has an orifice and a valve member moveable to open and closed positions to control fluid flow through the orifice and when the valve is in its open position liquid fuel flows through the orifice and into the fill control float to cause the fill control float to sink when sufficiently filled with fuel.

14. The apparatus of claim 13 wherein the valve member is a ball which remains in its closed position when the vehicle is at rest and the ball moves to its open position when the vehicle accelerates sufficiently.

15. The apparatus of claim 7 which also comprises a pin extending from the fill control float and a pin extending from the second float and constructed to be engaged by the fill control float pin to move the second float toward its closed position when the fill control float is buoyant in liquid fuel in the tank.

16. The apparatus of claim 15 wherein at least one of the pins can be modified to control the level of fuel required to cause the fill control float to move the second float toward its closed position.

17. The apparatus of claim 5 which also comprises a vent passage carried by the stem and communicating the control passage with the outlet passage, the vent passage being substantially smaller in size than the pilot valve.

18. The apparatus of claim 5 which also comprises openings in the housing through which fuel vapor in the fuel tank flows into the housing and the openings are offset from each other to provide a convoluted flow path to prevent liquid fuel from entering the main valve during normal operating conditions of the vehicle.

19. The apparatus of claim 18 which also comprises at least one baffle wall which in cooperation with the openings provide the convoluted flow path.

20. The apparatus of claim 5 wherein the pilot valve has a seat carried by the main valve and a closure engageable with the seat of the pilot valve, and the closure is movable toward the seat by the fill control float.

21. A vapor control apparatus for a vehicle fuel tank having a fill pipe with an inlet above the fuel tank comprising;

a housing constructed to be received in the fuel tank adjacent the top of the fuel tank;

an outlet passage in the housing communicating the interior of the fuel tank with the exterior of the fuel tank and through which fuel vapor is vented from the fuel tank;

a main valve associated with the outlet passage and movable from an open position permitting the free flow of fuel vapor from the interior of the tank through the outlet passage and toward a closed position at least severely retarding the flow of fuel vapor from the interior of the tank through the outlet passage;

a fill control float received in the housing and initially responsive to the level of fuel in the fuel tank to control movement of the main valve sufficiently toward its closed position when a predetermined maximum fuel level is reached within the fuel tank when refueling the fuel tank to cause fuel to rise in the fill pipe of the tank to a level adjacent the inlet of the fuel pipe to actuate an automatic shut-off of a fuel refilling nozzle with its outlet received in the inlet of the fill pipe, and constructed to delay the reopening of the main valve for a period of time after refueling and to thereafter fully open the outlet passage to permit fuel vapor to flow through the outlet passage after refueling is completed;

a pilot valve carried by the main valve in communication with the fill control float and having an open position spaced from the fill control float and a closed position engaged with the fill control float and when the pilot valve is open a net force acting on the main valve causes the main valve to be in its open position;

a diaphragm carried by the housing and defining a chamber, and a control passage through the main valve communicating the pilot valve with the chamber, and the pilot valve, main valve and diaphragm are constructed and arranged so that the main valve is open regardless of the pressure within the fuel tank so long as the level of fuel in the fuel tank does not cause the control float to cause the main valve to close.

22. A vapor control apparatus for a vehicle fuel tank having a fill pipe with an inlet above the fuel tank comprising:

a housing constructed to be received in the fuel tank adjacent the top of the fuel tank;

an outlet passage in the housing and a main valve seat defined by the housing at an upstream end of the outlet passage, said outlet passage communicating the interior of the fuel tank with the exterior of the fuel tank and through which fuel vapor is vented from the fuel tank;

a diaphragm carried by the housing and defining a chamber;

a main valve connected to the diaphragm, associated with the outlet passage and movable relative to the main valve seat from an open position permitting the free flow of fuel vapor from the interior of the tank through the outlet passage and toward a closed position at least severely retarding the flow of fuel vapor from the interior of the tank through the outlet passage;

a control passage through the main valve and communicating the chamber with the interior of the fuel tank through a pilot valve seat carried by the main valve;

a pilot valve which is normally open and spaced from the pilot valve seat and movable toward the pilot valve seat to at least partially close the control passage from communication with the interior of the fuel tank; and a fill control float received in the housing separate from the main valve to move the pilot valve toward the pilot valve seat in response to a sufficiently rising fuel level in the fuel tank to control movement of the main valve sufficiently toward its closed position when a predetermined maximum fuel level is reached within the fuel tank when refueling the fuel tank to cause fuel to rise in the fill pipe of the fuel tank to a level adjacent the inlet of the fill pipe to actuate an automatic shut off of a fuel refueling nozzle with its outlet received in the inlet of the fill pipe, and constructed to delay the reopening of the main valve for a period of time after refueling and to thereafter fully open the outlet passage to permit fuel vapor to flow through the outlet passage after refueling is completed.

23. The apparatus of claim 22 which also comprises a second float constructed to control movement of the main valve from its open position towards its closed position when acted upon by the control float.

24. The apparatus of claim 23 wherein the second float and control float are operably connected.

25. The apparatus of claim 23 wherein the second float and control float are capable of moving independently of each other.

26. The apparatus of claim 22 wherein the control float partially closes the outlet passage to reduce the flow rate through the outlet passage and a second float completely closes the outlet passage when the predetermined maximum fuel level is reached in the fuel tank.

27. The apparatus of claim 22 wherein the control float has an inverted cup shape defining a chamber in which gases become trapped when the level of fuel in the fuel tank reaches the bottom of the control float to make the control float buoyant and an opening formed in the control float permits gases trapped in the control float to slowly escape to reduce the buoyancy of the control float in the fuel.

28. The apparatus of claim 27 wherein the control float is buoyant for at least one minute to ensure it remains buoyant until refueling of the fuel tank is complete.

29. The apparatus of claim 22 wherein the control float is generally cup-shaped and is buoyant in liquid fuel and has an opening formed therein which permits liquid fuel to slowly enter the control float to reduce the buoyancy of the control float in the fuel.

30. The apparatus of claim 29 wherein the control float is buoyant for at least one minute to ensure it remains buoyant until refueling of the fuel tank is completed.

31. The apparatus of claim 22 in which the main valve is moveable to open and closed positions to selectively communicate the interior of the fuel tank with the outlet passage and the control float controls the movement of the main valve.

32. The apparatus of claim 22 which also comprises openings in the housing through which fuel vapor in the fuel tank flows into the housing and the openings are offset from each other to provide a convoluted flow path to prevent liquid fuel from entering the main valve during normal operating conditions of the vehicle.

33. The apparatus of claim 32 which also comprises at least one baffle wall carried by the housing and in cooperation with the offset openings are constructed to provide the convoluted flow path to prevent liquid fuel from entering the main valve.

34. The apparatus of claim 22 which also comprises a valve carried by the control float and the valve has an orifice and a valve member moveable to open and closed positions to control the fluid flow through the orifice and when the valve member is in its open position liquid fuel flows through the orifice and into the control float to cause the control float to sink.

35. The apparatus of claim 34 wherein the valve member is a ball which remains in its closed position when the vehicle is not accelerating or decelerating and the ball moves to its open position when the vehicle accelerates or decelerates sufficiently.

36. The apparatus of claim 22 wherein the main valve is biased to its closed position until at least some super atmospheric pressure exists in the fuel tank.

37. The apparatus of claim 22 wherein the main valve is biased to its closed position until a super atmospheric pressure of not more than about 10 in. $H_2O$ exists in the fuel tank.

* * * * *